United States Patent [19]

Ohkumo et al.

[11] Patent Number: 5,038,736

[45] Date of Patent: Aug. 13, 1991

[54] METHOD FOR CONTROLLING IGNITION TIMING OF AN INTERNAL COMBUSTION ENGINE

[75] Inventors: Hiroya Ohkumo, Musashino; Shuji Miyama, Musashimurayama, both of Japan

[73] Assignee: Fuji Jukogyo Kabushiki Kaisha, Tokyo, Japan

[21] Appl. No.: 518,801

[22] Filed: May 4, 1990

[30] Foreign Application Priority Data

May 18, 1989 [JP] Japan .................................. 1-125133

[51] Int. Cl.⁵ .............................................. F02P 5/14
[52] U.S. Cl. .................................................. 123/425
[58] Field of Search ........................... 123/425, 435;
364/431.08

[56] References Cited

U.S. PATENT DOCUMENTS

| | | | |
|---|---|---|---|
| 4,620,518 | 11/1986 | Nagai | 123/425 |
| 4,640,249 | 2/1987 | Kawamura et al. | 123/425 |
| 4,694,801 | 9/1987 | Nagai | 123/425 |
| 4,819,603 | 4/1989 | Morita et al. | 123/425 |

Primary Examiner—Tony M. Argenbright
Assistant Examiner—Robert E. Mates
Attorney, Agent, or Firm—Martin A. Farber

[57] ABSTRACT

An ignition timing controlling system is provided for calculating an ignition timing based on a basic ignition timing, a learning correcting quantity including a large correcting quantity and a small correcting quantity, and a feedback correcting quantity. In response to an occurrence of knocking, a large retard value is produced. When the large retard value exceeds a reference value, the learning correcting quantity of the small correcting quantity is changed to the learning correcting quantity of the large correcting quantity.

3 Claims, 13 Drawing Sheets

METHOD FOR CONTROLLING IGNITION TIMING OF AN INTERNAL COMBUSTION ENGINE

BACKGROUND OF THE INVENTION

The present invention relates to a method for controlling the ignition timing of an internal combustion engine such as an automotive engine and more particularly to a method of controlling the ignition timing at a time when a maximum limit ignition timing for obtaining maximum torque without causing knocking is largely retarded in accordance with an octane number of gasoline used in the engine or engine operating conditions.

A learning control system for correcting the ignition timing has been proposed. The control system is adapted to advance the ignition timing so as to produce a maximum torque as long as the level of the engine knock does not exceed a tolerable level. If the knock occurs, the control system operates to retard the ignition timing by a predetermined value. A maximum limit ignition timing for producing the maximum torque without causing knocking depends on a type of the engine and on the octane number of the fuel used in the engine. Namely, when high-octane gasoline or mixture thereof with regular gasoline is used, the ignition timing is advanced compared with that for low-octane gasoline to increase the torque. If the octane number varies, or if a large change in engine operating conditions occurs, the ignition timing varies accordingly so that it is necessary to correct the timing through a learning control system.

The maximum ignition timing is advanced as the octane number of the fuel increases. However, it is not advisable to advance the timing in accordance with the octane number over a limit ignition timing for producing a maximum torque dependent on the engine operating conditions because the torque is reduced.

Japanese Patent Application Laid-Open 61-157771 (U.S. Pat. No. 4,694,801) discloses a control system wherein the operation thereof is divided into an entire correction and a individual correction. In the entire correction, all of learning correcting quantities stored in a memory are roughly corrected to set the quantities to values approximate to limit values. In the individual correction, the learning correcting quantities are individually and finely corrected, in accordance with engine speed and intake air pressure. Thus, when the value of the fine correcting quantity becomes large and exceeds a predetermined value, the correcting operation is returned to the rough correction. At that time, the value is the deviation of the actual ignition timing from a desired value.

However, it takes a long time for a calculation of a correct ignition timing because an error between a desired ignition timing and an actual ignition timing is large. Accordingly, the calculation changes from the fine correction to the rough correction, so that a delay may occur. The delay of the returning is a problem in the case that the ignition timing is advanced because the knocking is not likely to occur.

To the contrary, when the high-octane gasoline is changed to the low-octane gasoline, the limit ignition timing is largely retarded so that the delay in returning to the rough correction causes a frequent knocking. Thus, it is necessary to quickly change the fine correction to the rough correction.

Moreover, the knocking induces more knockings because the knocking causes the temperature in the cylinder to rise.

SUMMARY OF THE INVENTION

The object of the present invention is to provide an ignition timing control method where ignition timing can be quickly corrected in accordance with an occurrence of knocking so as to avoid knocking.

An ordinary feedback signal based on the occurrence of the knocking generates earlier than the time when a deviation between a desired learning correcting quantity and an actual learning correcting quantity is calculated. The present invention is characterized by using a feedback signal based on the knocking for determining a generation of a large deviation, thereby quickly correcting the deviation.

According to the present invention, there is provided a method for controlling ignition timing of an internal combustion engine having an ignition timing control system for calculating an ignition timing based on a basic ignition timing, a learning correcting quantity including a large correcting quantity and a small correcting quantity, and a feedback correcting quantity.

The method comprises the steps of, detecting an occurrence of knocking and producing a knock signal, converging the feedback correcting quantity to a large retard value in response to the knock signal, comparing the large retard value with a predetermined reference value, generating a change signal when the large retard value exceeds the reference value, and changing the learning correcting quantity of the small correcting quantity to the learning correcting quantity of the large correcting quantity in response to the change signal.

In an aspect of the present invention, changing the feedback correcting quantity to the large retard value is performed by subtracting the large retard value from the feedback correcting quantity.

The present invention further provides a system for controlling ignition timing of an internal combustion engine having an ignition timing control system for calculating an ignition timing based on a basic ignition timing, a learning correcting quantity including a large correcting quantity and a small correcting quantity, and a feedback correcting quantity.

The system comprises detector means for detecting an occurrence of knocking and for producing a knock signal, changing means responsive to the knock signal for changing the feedback correcting quantity to a large retard value, comparing means for comparing the large retard value with a predetermined reference value and for producing a change signal when the large retard value exceeds the reference value, and means responsive to the change signal for changing the learning correcting quantity of the small correcting quantity to the learning correcting quantity of the large correcting quantity.

The other objects and features of this invention will become understood from the following description with reference to the accompanying drawings.

DETAILED DESCRIPTION OF THE PREFERRED EMBODIMENT

Figure 1:
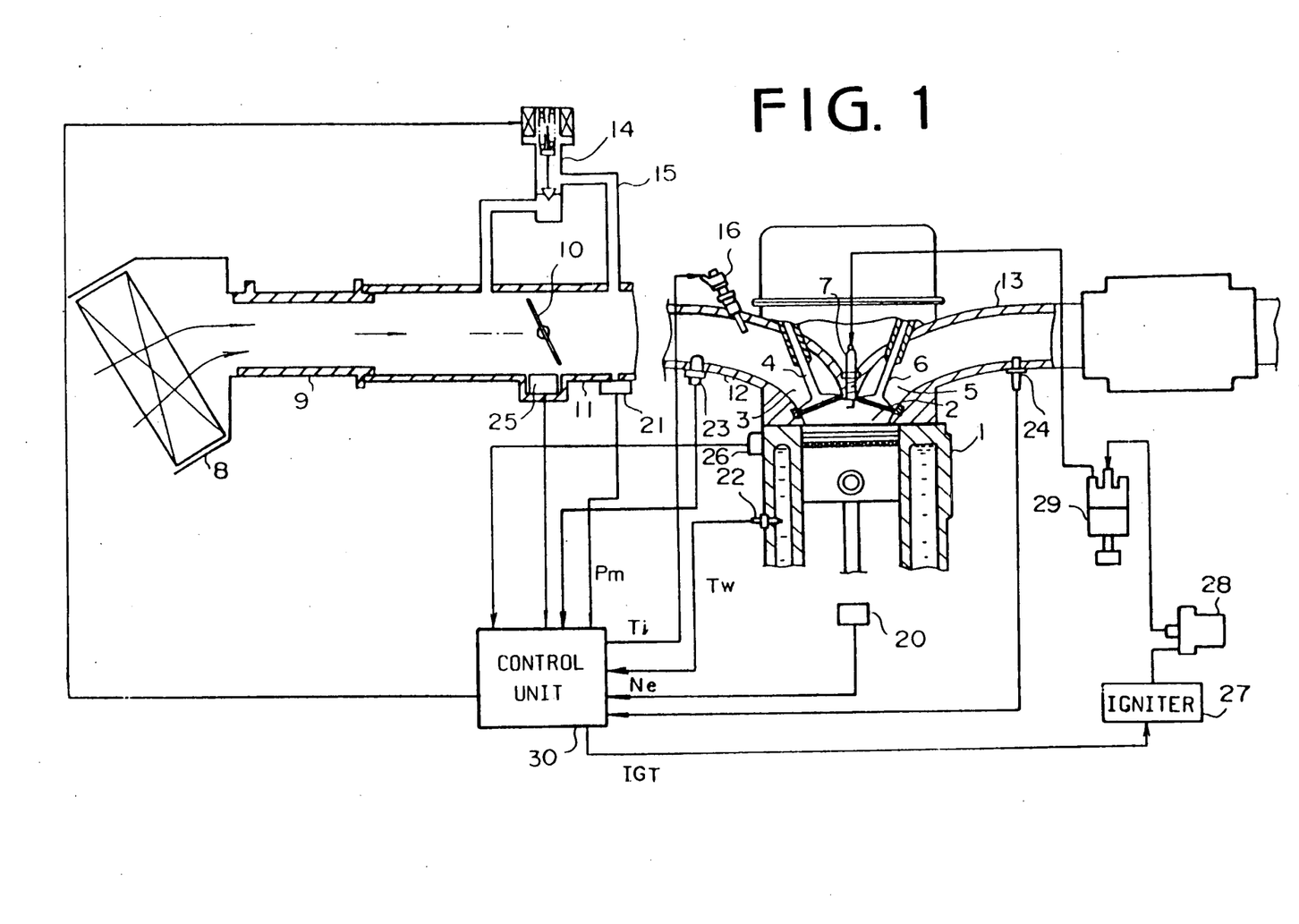
FIG. 1 is a schematic illustration of an engine to which the present invention is applied.

Referring to FIG. 1, an engine 1 has a throttle valve 10 provided in a throttle body 11 communicated with an air cleaner 8 through an intake pipe 9. The throttle body 11 is communicated with an intake manifold 12 which is communicated with a combustion chamber 2 of each cylinder in the engine 1 through an intake port 3 and an intake valve 4. A bypass 15 having an idle speed control (ISC) valve 14 is provided around the throttle valve 10. A spark plug 7 is located in each combustion chamber 2 and a multiple-point fuel injector 16 is provided in the intake manifold 12 adjacent each intake port 3. Exhaust gases of the engine 1 are discharged passing through an exhaust port 5, an exhaust valve 6 and an exhaust manifold 13. The engine 1 is provided with a crank angle sensor 20, a pressure sensor 21 for detecting pressure in the intake pipe 11 downstream of the throttle valve 10, a coolant temperature sensor 22, an intake air temperature sensor 23, an $O_2$-sensor 24 for detecting oxygen concentration of the exhaust gases in the exhaust manifold 13, a throttle position sensor 25 and a knock sensor 26. Output signals of the sensors 20 to 26 are applied to a control unit 30 which applies a fuel injection signal to the injector 16, an idle signal to the ISC valve 14 and an ignition signal to the spark plug 7 through an igniter 27, an ignition coil 28 and a distributor 29. Engine speed Ne is calculated based on a crank angle signal from the crank angle sensor 20 and an intake pressure Pm is calculated based on the signal from the pressure sensor 21, which are used for calculating a basic injection pulse width Tp. The basic injection pulse width Tp is corrected in accordance with a coolant temperature Tw from the coolant temperature sensor 22, an intake air temperature Ta from the intake air temperature sensor 23 and a feedback signal from the $O_2$-sensor 24. The fuel injector 16 injects a small amount of fuel which corresponds to the corrected injection pulse width Ti.

On the other hand, it is determined that the engine 1 is idling in accordance with a throttle opening degree detected by the throttle position sensor 25, or with an ON-signal of an idle switch. The opening degree of the ISC valve 14 is adjusted to control the engine idling speed.

Figure 2A:
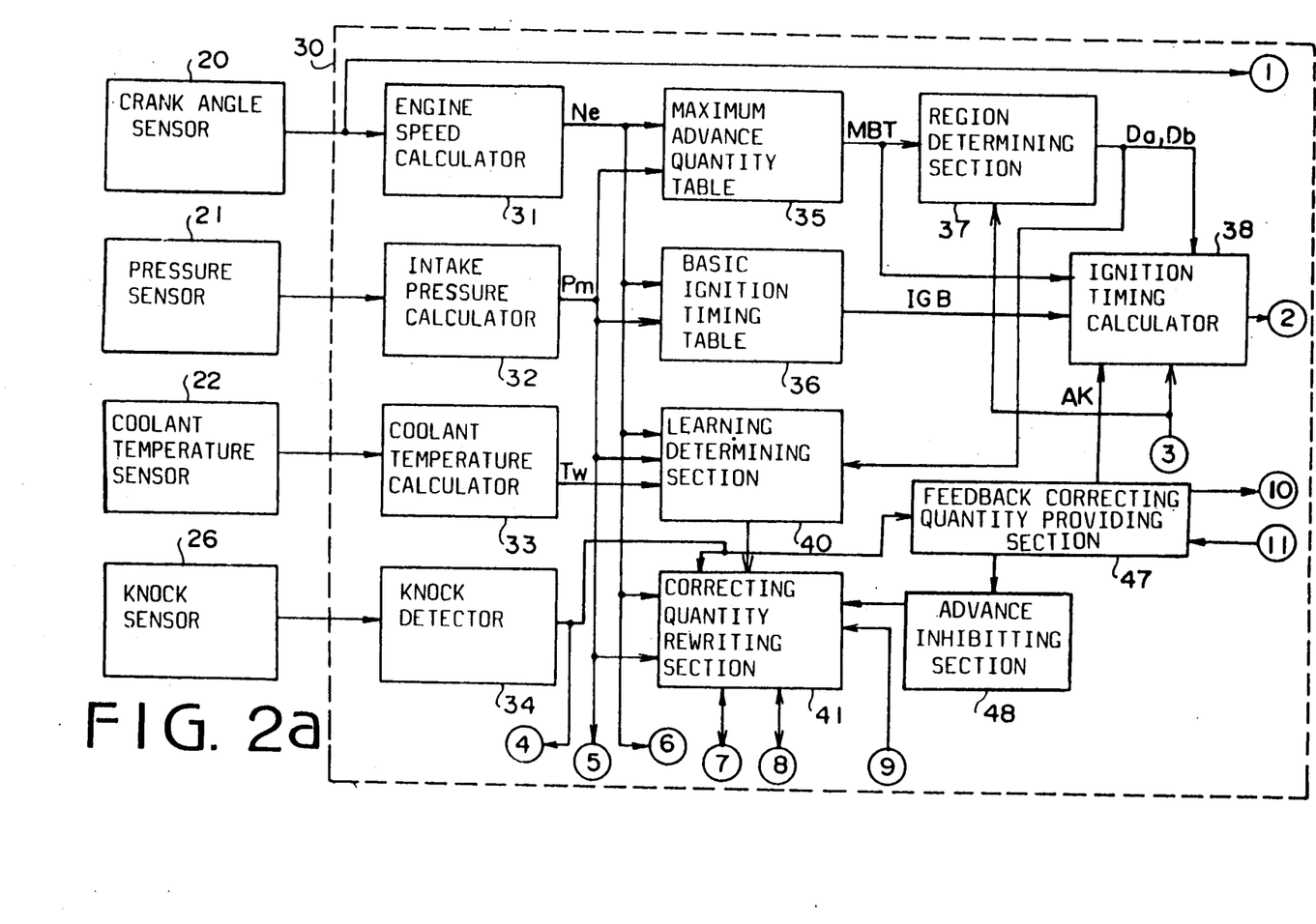
FIGS. 2a to 2c show a block diagram of a control system according to the present invention.
Figure 2B:
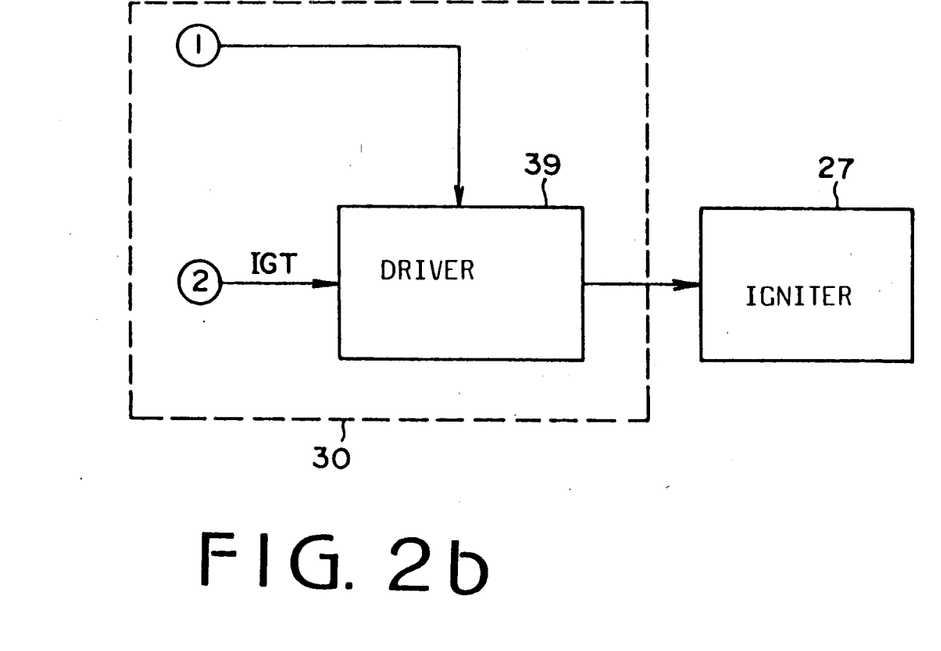
Figure 2C:
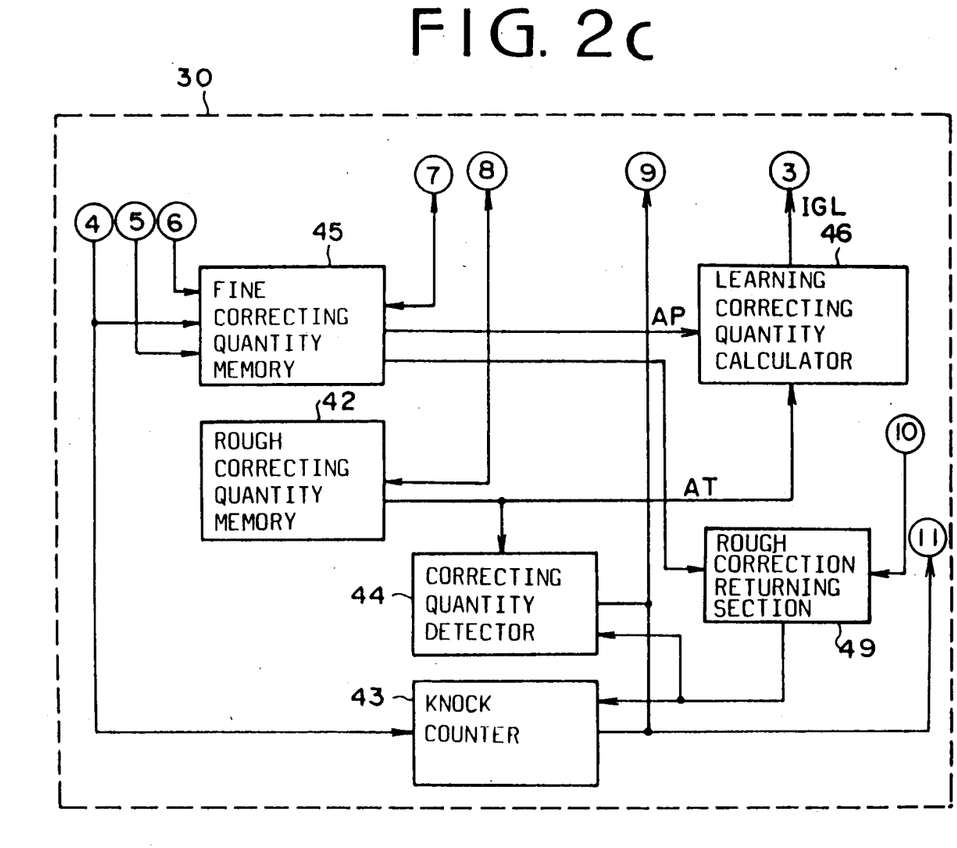

Referring to FIGS. 2a and 2c, the control unit 30 has an engine speed calculator 31, an intake pressure calculator 32 and a coolant temperature calculator 33 for calculating the engine speed Ne, the intake pressure Pm and the coolant temperature Tw based on the output signals of the crank angle sensor 20, the pressure sensor 21 and the coolant temperature sensor 22, respectively. A knock detector 34 is provided to produce a knock signal when the knock sensor 26 detects knocking of the engine.

Figure 7:
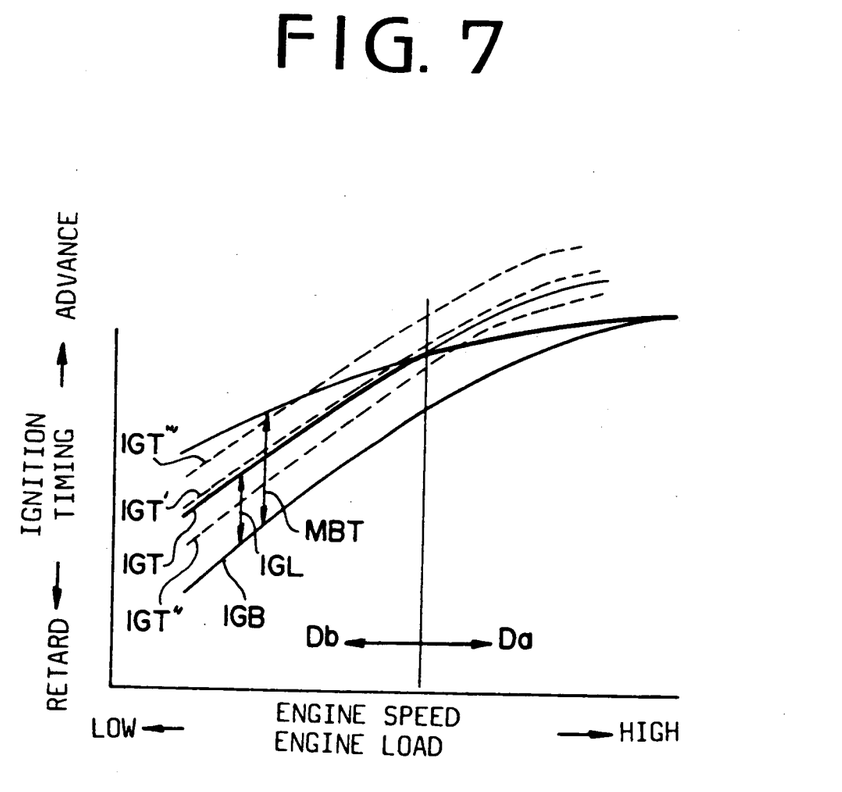
FIG. 7 to is a graph showing characteristics of ignition timing and advance quantity in accordance with engine speed and engine load.

The engine speed Ne and the intake pressure Pm are fed to a basic ignition timing look-up table 36 and a maximum advance quantity look-up table 35. The basic ignition timing table 36 stores a plurality of basic ignition timings IGB, arranged in accordance with the engine speed Ne and the intake air pressure Pm. The basic ignition timing IGB is a maximum timing for producing maximum torque with low-octane gasoline without causing the knocking. The basic timing IGB advances with an increase of the engine speed Ne and an increase of the engine load represented by the intake air pressure Pm as shown in FIG. 7. The maximum advance quantity table 35 stores a plurality of maximum advance quantities MBT, arranged in accordance with the engine speed Ne and the intake pressure Pm. The maximum advance quantity MBT is a value to be added to the basic ignition timing IGB to obtain maximum torque with high-octane gasoline without causing knocking A maximum ignition timing IGT' for obtaining the maximum torque is parallely shifted in advancing direction with an increase in the octane number of the fuel.

The maximum advance quantity MBT, a learning correcting quantity IGL obtained through the learning procedure and a knocking feedback correcting quantity AK obtained through a feedback procedure, operations of which will be later described, are fed to a region determining section 37. In the determining section 37, the maximum advance quantity MBT and the learning correcting quantity IGL are compared with one another to select one of regions Da and Db shown in FIG. 7. When the maximum advance quantity MBT is smaller than the sum of the correcting quantity IGL and the knocking feedback correcting quantity AK (MBT≦IGL+AK), the region Da is selected, where the maximum advance quantity MBT is used for obtaining an ignition timing IGT. To the contrary, when the maximum advance quantity MBT is larger than the sum of the learning correcting quantity IGL and knocking feedback correcting quantity AK (MBT>IGL+AK), the region Db is selected, where the correcting quantity IGL is derived.

The output signal of the region determining section 37, the maximum advance quantity MBT and basic ignition timing IGB, the learning correcting quantity IGL and the knocking feedback correcting quantity AK are fed to an ignition timing calculator 38. When the region Db is selected, a learning correcting quantity IGL is derived to advance the basic ignition timing IGB. The ignition timing IGT is calculated as follows.

$$IGT = IGB + IGL + AK$$

On the other hand, in the region Da, the basic ignition timing IGB is advanced by the maximum advance quantity MBT so that the ignition timing IGT is calculated as follows.

$$IGT = IGB + MBT$$

The ignition timing IGT is applied to the igniter 27 through a driver 39 so as to ignite the spark plug at the calculated timing IGT in accordance with the crank angle signal.

The control unit 30 further has a system for obtaining the learning correcting quantity IGL through learning. A learning determining section 40 is applied with the output signal of the region determining section 37, the engine speed Ne, the intake pressure Pm and the coolant temperature Tw to determine whether the engine operating conditions are proper for performing the learning operation. The learning operation is executed when the vehicle is driven in a warmed up state, and in a high engine load range and a low engine speed range where the knocking can be accurately detected, and when the Db range is selected. The output signal of the determining section 40 is applied to an ignition timing correcting quantity rewriting section 41 to which the engine speed Ne, the intake pressure Pm and the knock signal are further fed. The correcting quantity rewriting section 41 selectively performs an entire rough correcting operation with a large correcting quantity and an individual fine correcting operation with a small correcting quantity in accordance with the engine operating conditions. All of rough learning correcting quantities AT stored in a rough correcting quantity memory 42 are rewritten dependent on the knock signal from the knock detector 34 so that the real ignition timing IGT approximates the desired maximum timing IGT' dependent on the octane number of the fuel. When the knocking does not occur, the learning operation is once performed every predetermined period t1, for example, 1second, to increase the rough learning correcting quantities AT by a predetermined value a, thereby changing the rough learning correcting quantities in the advance direction. On the other hand the correcting quantities AT are decreased by a predetermined value $\gamma$ every time knocking occurs. A knock counter 43 is fed with the knock signal to count the occurrence of the knocking. When the knocking counts up to a predetermined number $\alpha$, for example 5 times, the knock counter 43 produces an output signal which is applied to the correcting quantity rewriting section 41. A correcting quantity detector 44 is fed with a correcting quantity AT derived from the memory 42 to compare the quantity with a predetermined maximum advance quantity AM. When the correcting quantity AT reaches the maximum advance quantity AM, a signal is fed to the rewriting section 41. The rewriting section 41 stops the rough correction when either of the signals from the counter 43 or the detector 44 is fed, estimating that the ignition timing has approached the desired maximum timing IGT'.

A fine correcting operation is carried out thereafter. A fine learning correcting quantity AP is read out from a fine correcting quantity memory 45 storing a plurality of fine learning correcting quantities AP which are arranged in accordance with the engine operating conditions. A designated fine learning correcting quantity AP is similarly increased or decreased by learning in the rewriting section 41 in dependency on the occurrence of the knocking. Thus, the ignition timing IGT is further advanced to approach the desired maximum timing IGT'.

The rough learning correcting quantity AT and the fine learning correcting quantity AP are fed to a learning correcting quantity calculator 46 where the learning correcting quantity IGL is calculated as follows.

$$IGL = AT + AP$$

The learning correcting quantity IGL is fed to the ignition timing calculator 38 as described hereinbefore.

The control unit 30 of the present invention is further provided with a knocking feedback control system. The knock signal from the knock detector 34 and the output signal of the knock counter 43 are fed to a feedback correcting quantity providing section 47 where the knocking feedback correcting quantity AK is provided. When a knocking occurs, the correcting quantity AK is decreased by a predetermined retard value $\gamma_F$, which is several times larger than the value $\gamma$ of the learning correcting quantities AT and AP, so as to retard the ignition timing IGT. The value of the retard value $\gamma_F$ is increased with an increase of the number of occurrence of the knocking. When the knocking is suppressed, a predetermined small advance value $a_F$ which is substantially the same value as the value a for the learning correction is provided. The feedback correcting quantity AK is fed to the ignition timing calculator 38 to correct the basic ignition timing IGB as hereinbefore explained.

In order to prevent the learning correction from interfering with the feedback correction which causes fluctuations of the learning correcting quantity IGL, the feedback correcting quantity AK is fed to an advance inhibiting section 48. The advance inhibiting section 48 applies an inhibit signal to the rewriting section 41 in response to the feedback correcting quantity signal AK to stop the increase of an advanced value of the learning correcting quantity IGL until the retarded value in accordance with the feedback correcting quantity AK becomes zero.

The feedback correcting quantity AK is further applied to a rough correcting returning section 49 to which the fine learning correcting quantity AP is fed. The rough correction returning section 49 determines to restore the rough correction when the fine correcting quantity AP is out of a permissible range x1 for example, $-10°$ CA (crank angle) to $-10°$ CA, or when a calculated feedback correcting quantity AK is out of a permissible range x2, for example, $0°$ to $5°$ CA. The output signal of the rough correction returning section 49 is fed to the knocking counter 43 and the correcting quantity detector 44 to stop feeing of the respective signals to the rewriting section 41 so that the rough correction is again executed.

Figure 3A:
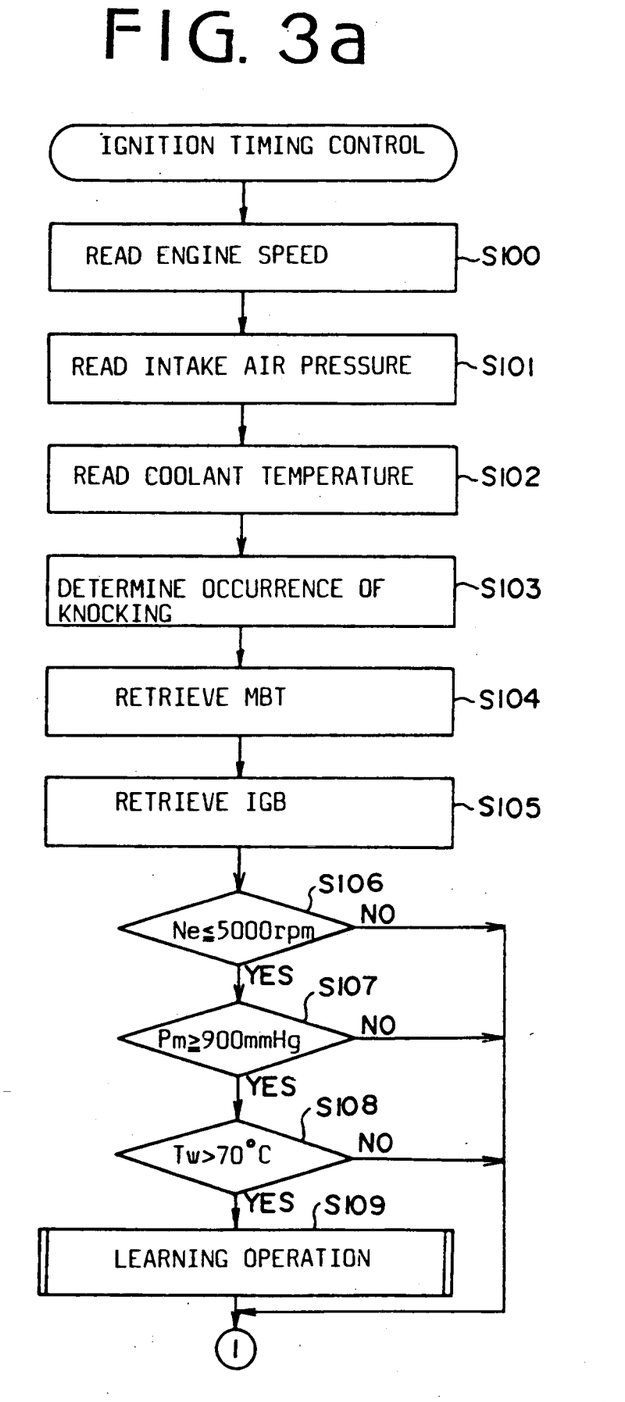
FIGS. 3a, 3b, 4a, 4b, 5 and 6 are flowcharts showing an operation of the system.
Figure 3B:
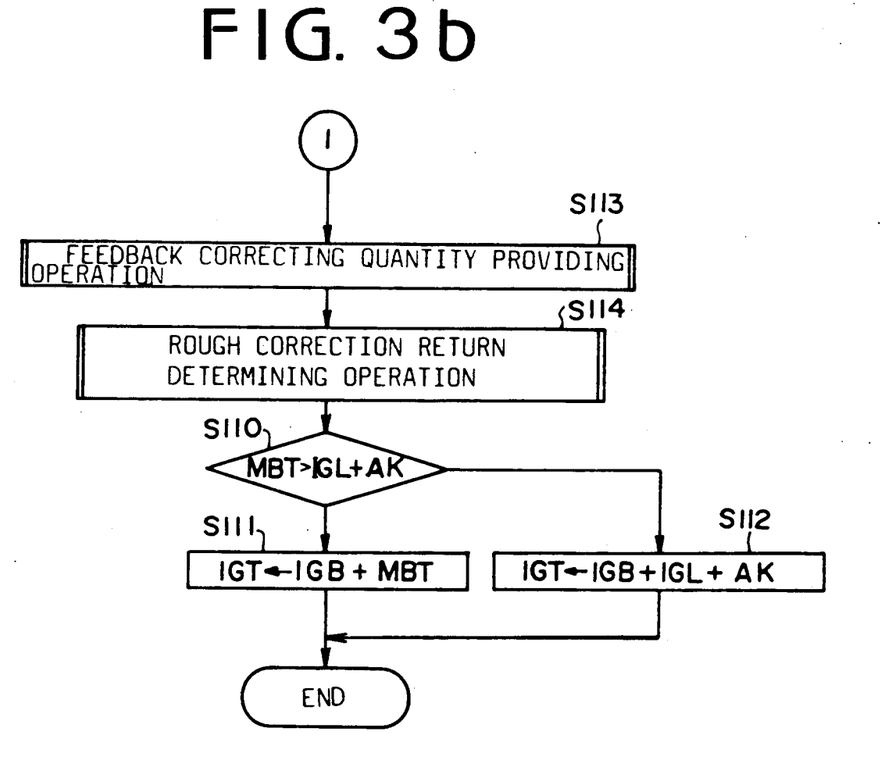

FIGS. 3a and 3b show the operation of the system in summary. When the program starts, the engine speed Ne, the intake air pressure Pm and the coolant temperature Tw are read out at steps S100 to S102. At a step S103, an occurrence of the knock is detected. Thereafter, at steps S104 and S105, the maximum advance quantity MBT and the basic ignition timing IGB are read out from the respective tables 35 and 36 in accordance with the engine speed Ne and the intake air pressure Pm. Steps S106 to S108 determine whether conditions for the learning are satisfied. More particularly, improper conditions for learning, such as cold engine, or high engine speed range where the knock signal is liable to contain noises or low engine load range where the output of the sensors are low, are omitted at the steps S106 to S108. That is, it is determined whether the engine speed Ne is smaller than 5000 rpm (Ne $\leq$ 5000 rpm), the intake pressure Pm is higher than 900 mmHg (Pm $\geq$ 900 mmHg) and whether the coolant temperature Tw is higher than 70° C. (Tw $>$ 70° C.). When all of the answers at the steps S106 to S108 are YES, the program goes to a step S109 for the learning operation which is described in FIGS. 4a and 4b.

Figure 4A:
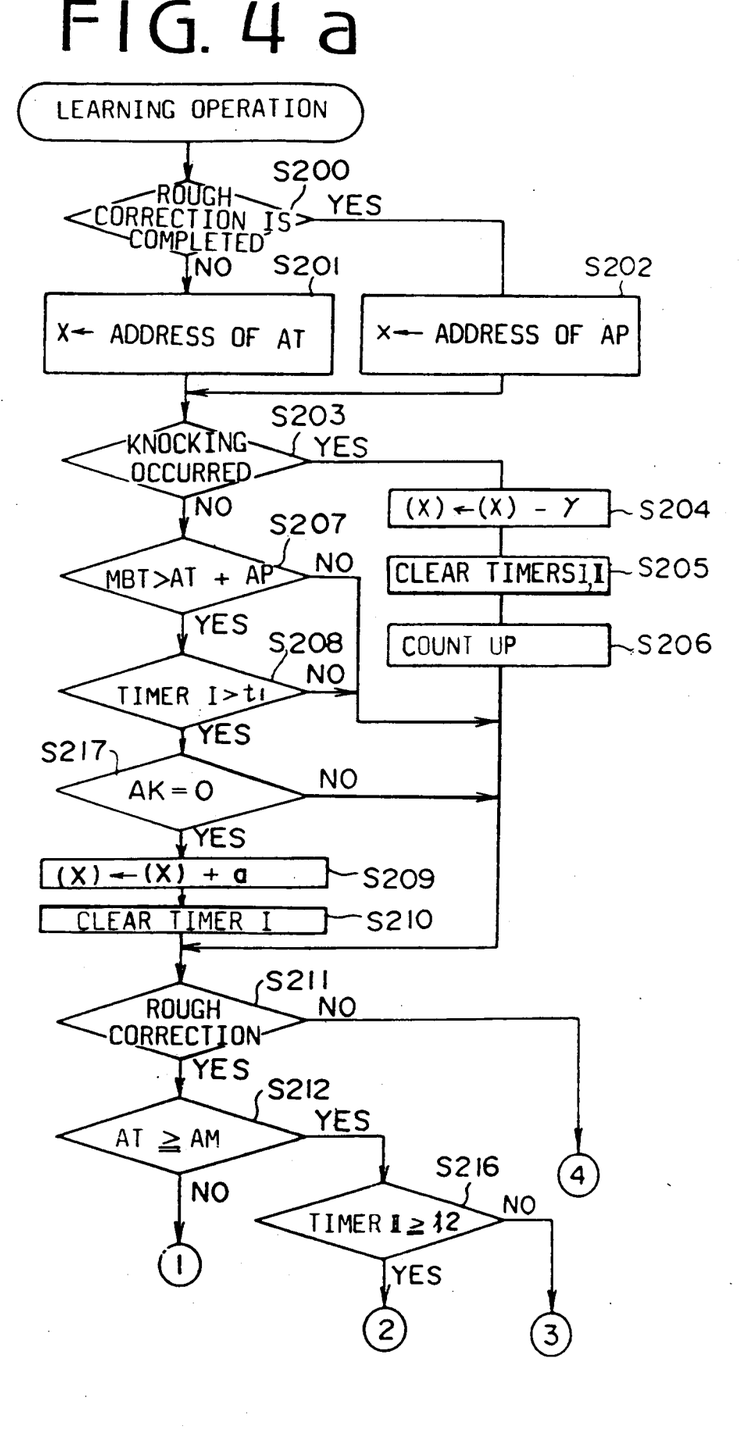
Figure 4B:
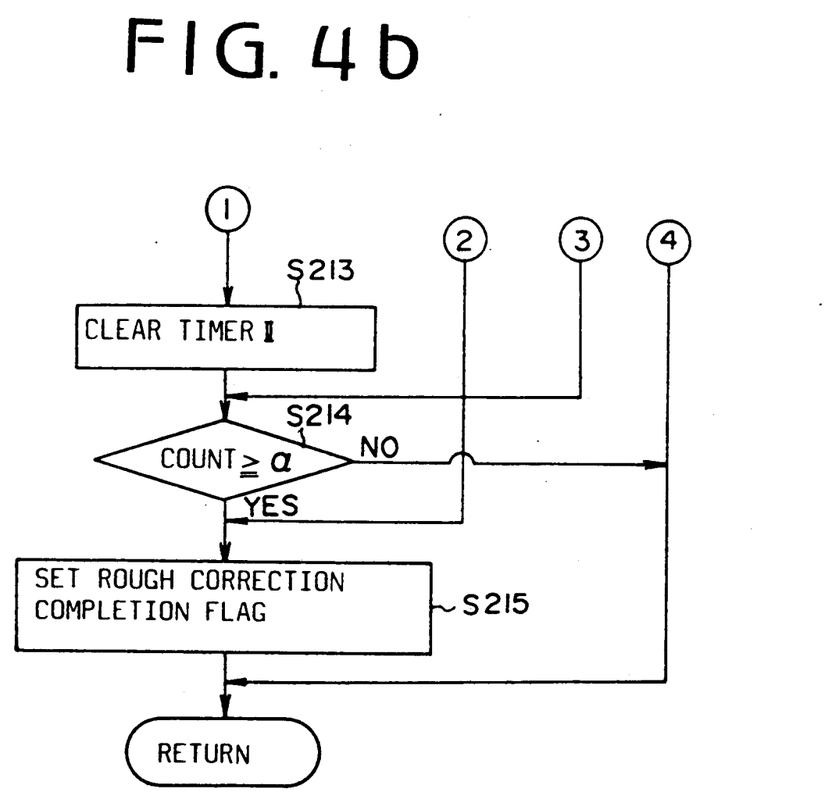

A step S200 determines whether the entire rough learning correction is completed. When the rough learning correction is not completed, an address of the rough learning correcting quantity AT in the memory 42 is stored in an index register X at a step S201. The program proceeds to a step S203 where it is determined whether a knock has occurred during the program. When the occurrence of the knock is determined, the program proceeds to a step S204, and if not, proceeds to a step S207. At the step S204, all of the rough learning correcting quantities AT are decremented by a correcting quantity γ. Timers I and II are cleared at a step S205 and the counter 43 counts up the occurrence of the knocking at a step S206.

On the other hand, at the step S207, the maximum advance quantity MBT is compared with the corresponding learning correcting quantity IGL (AT +AP). When the maximum advance quantity MBT is smaller than the correcting quantity IGL, the learning operation is terminated, since the correcting quantity IGL exceeds the (limit) maximum advance quantity MBT. At a step S208, the timer I for measuring the period during which knocking does not occur is checked to determine whether the engine 1 has operated without causing the knocking for the predetermined period t1 (for example 1 second). If the present time is within the period t1, the learning is not executed. When the knocking has not occurred for the period t1, a step S217 determines whether the feedback correcting quantity AK is zero or not. When the feedback correcting quantity AK is zero, the correcting quantities AT are incremented by the quantity a at a step S209, and the timer I is cleared at a step S210.

Following steps S211 to S215 are provided for determining completion of the rough learning correction. At a step S211, it is determined whether the rough correction is still being carried out. When the corresponding correcting quantity AT is smaller than the predetermined maximum advance quantity AM (step S212), the timer II is cleared at a Step S213. At a step S214, it is determined that the rough correction is completed when the knocking has occurred more the predetermined number α (for example 5 times) so that a rough correcting completion flag is set at a step S215.

When the rough learning correcting quantity AT reaches the predetermined maximum quantity AM (step S212), it is determined at a step S216 whether a predetermined period t2, for example 3 seconds, has passed since the start of the rough correction. The program is repeated to continue the rough correction for the predetermined period. When the period has passed, the program proceeds to the step S215.

When the rough learning correcting operation is completed, the program goes to a step S202 form the step S200 where an address of the fine correcting quantity AP is stored in the index register X. Thereafter, steps similar to the steps S203 to S210 are carried out. Namely, when a knocking occurs, a corresponding fine learning correcting quantity AP is decreased by a predetermined correcting quantity γ. To the contrary, when the knocking does not occur, the fine correcting quantity AP is increased once at every period t1 to advance the timing. When it is determined at the step S211 that the fine correction is being carried out, the program is repeated except performing the rough learning correction.

Figure 5:
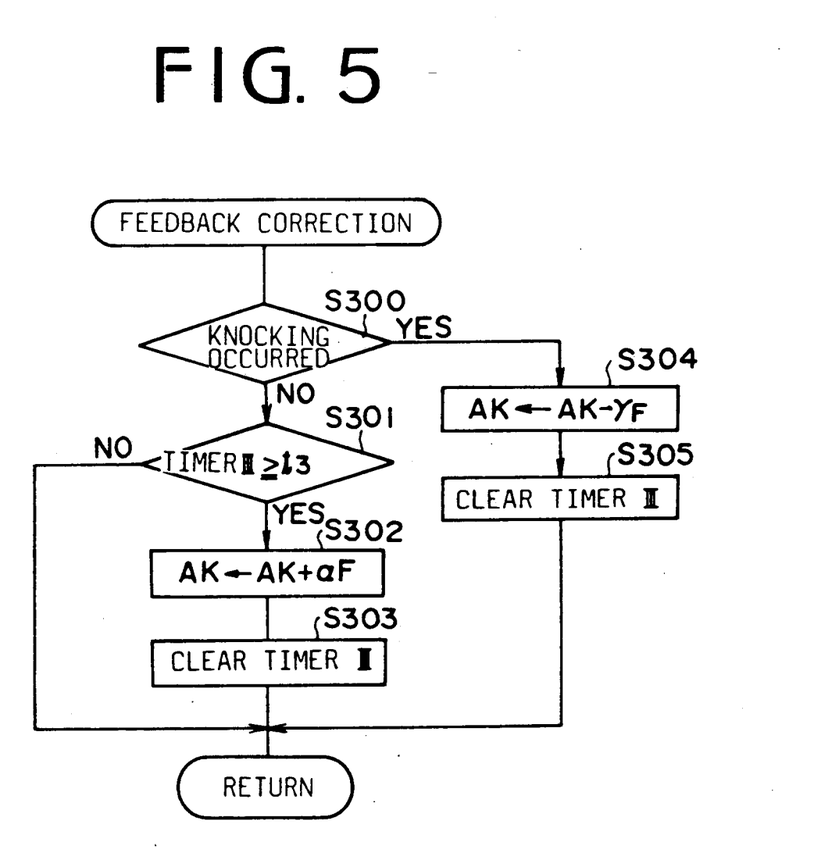
Figure 6:
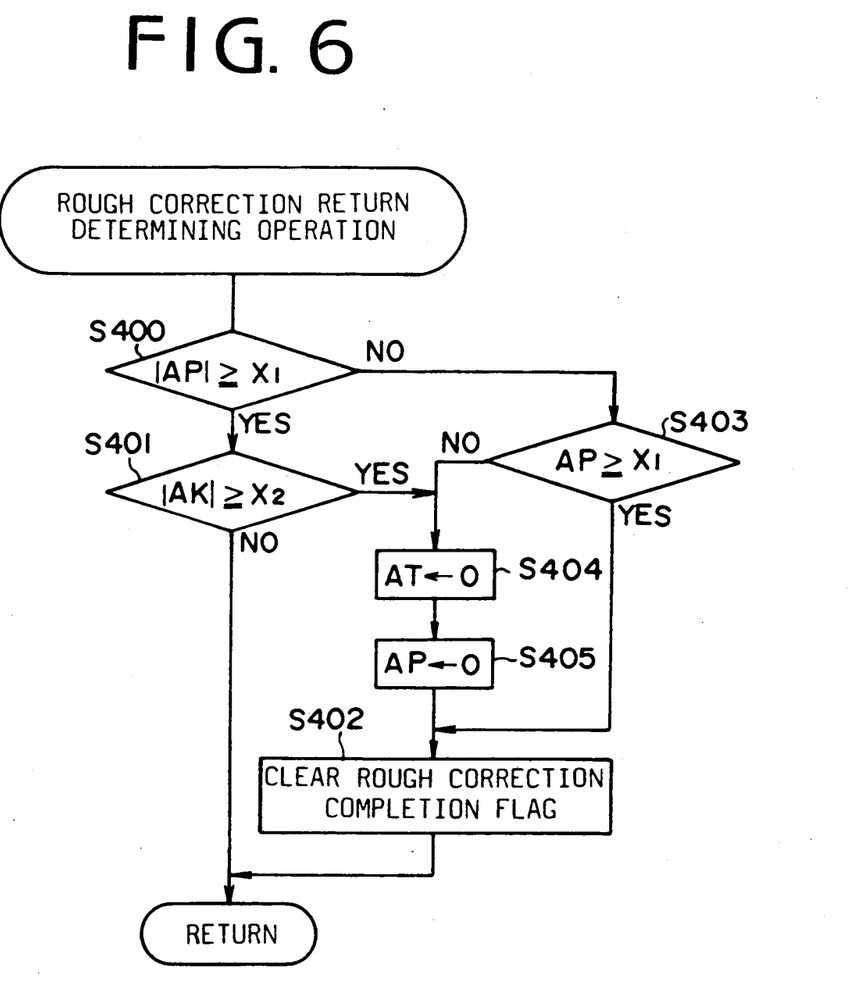

During the fine correction, the program shown in FIGS. 3a and 3b proceeds to a step S113 to execute the feedback correction and thereafter to a step S114 for the rough correction return determining operation which are described in FIGS. 5 and 6, respectively.

Thereafter, the program proceeds to a step S110 where it is determined whether the maximum advance quantity MBT is larger than the sum of the correcting quantity IGL, which is the sum of the rough correcting quantity AT and fine correcting quantity AP, and the feedback correcting quantity AK. When the MBT is smaller than IGL+AK (MBT≦IGL+AK), the program goes to a step S111 to calculate the ignition timing IGT by advancing the basic injection timing IGB with the maximum advance quantity MBT. To the contrary, if the MBT is larger than the IGL+AK (MBT>IGL+AK), the ignition timing IGT is determined by advancing the basic timing IGB with the correcting quantity IGL plus AK at a step S112. Thus, the ignition timing IGT close to the desired maximum timing IGT' can be obtained as shown by a bold line in FIG. 7.

Figure 8A:
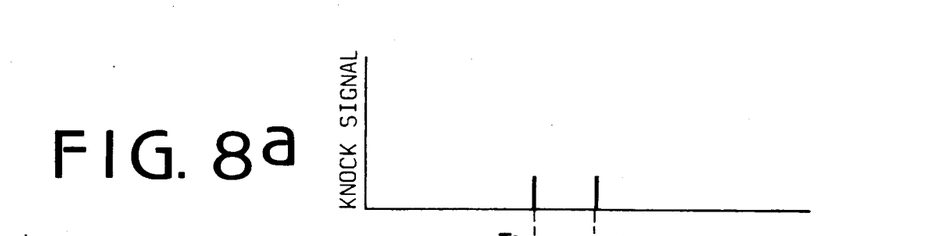
FIGS. 8a, 8b and 8c are a time chart explaining the operation of the present invention.
Figure 8B:
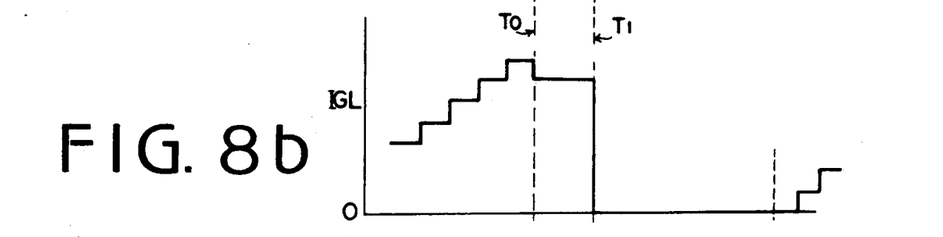
Figure 8C:
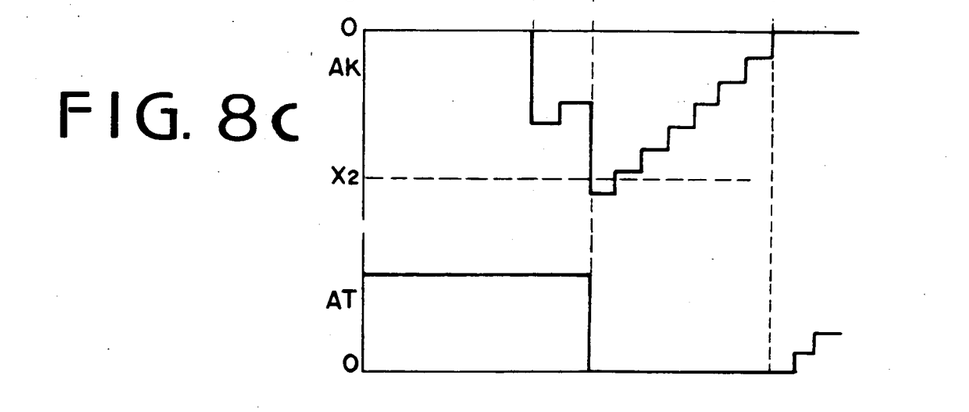

The operation of the feedback correction is described hereinafter with reference to FIG. 5. When one knocking occurs at a time TO as shown in FIGS. 8a–8c (step S300), the program goes to a step S304 so that the feedback correcting quantity AK is decreased by the large value $\gamma_F$ and a timer III for timing a period of absence of knocking is cleared at a step S305. At the same time, since the fine correction is being carried out, the fine correcting quantity AP is decreased by the value γ at the step S204 shown in FIG. 4a, thereby decreasing the learning correcting quantity IGL. The ignition timing IGT is therefore largely retarded by the correcting quantities IGL and AK.

If it is determined at the step S300 that the knocking did not occur thereafter, the program goes to a step S301 where the timer III is checked to determine whether the knocking does not occur for a predetermined period $t_3$. At a step S302, the feedback correcting quantity AK is increased by the value $a_F$ and the timer III is cleared at a step S303. On the other hand, in the fine correction operation shown in FIG. 3a, since it is determined at the step S217 that the feedback correcting quantity AK did not reach zero, the program goes to the step S211 without increasing the fine correcting quantity AP. Hence the learning correcting quantity IGL stays constant.

If the fuel is changed from the high-octane gasoline to the low-octane gasoline, the maximum (limit) ignition timing MBT is largely changed in the retard direction. Consequently, one knocking occurs at a time Tl as shown in FIGS. 8a–8b. The program shown in FIG. 5 is thus repeated. In response to the consecutive knocking, the knocking feedback correcting quantity AK is further decreased by the value $\gamma_F$, namely the knocking feedback correcting quantity AK is changed to a large retard value. The ignition timing IGT is largely retarded accordingly.

The rough correcting quantity AT and the fine correcting quantity AP are prevented from increasing while the feedback correcting quantity AK is smaller than zero (advance inhibiting section 48).

The rough correction return determining operation at the step S114 of FIG. 3b is described hereinafter with reference to FIG. 6. When the fine correcting quantity AP derived in accordance with the engine operating conditions is within the permissible range x1 (step S400), the program goes to a step S401 where it is determined whether the calculated feedback correcting quantity AK is also in the permissible range x2. If the feedback correcting quantity AK exceeds the range x2 ($|AK|\geq x2$) at the time T1 as shown in FIG. 8c, the rough correcting quantity AT and the fine correcting quantity AP are cleared at steps S404 and S405, respectively. The rough correction completion flag set at the step S215 in FIG. 4b is cleared at a step S402 so that the rough correction is executed. Thus, the real ignition timing IGT quickly approaches a maximum ignition timing IGT" (FIG. 7) for a low-octane gasoline.

To the contrary, when the octane number of the gasoline changes to a large value, a desired maximum ignition timing IGT''' is advanced as shown in FIG. 7. The fine correcting quantity AP consequently increases so that, when the fine correcting quantity AP exceeds the range x1 at the step S400 in FIG. 6, the program goes to the step S402 through a step 403. Thus, the rough correction is retarded.

From the foregoing, it will be understood that since a large deviation of the ignition timing IGT is detected by a knocking feedback correcting quantity, the rough correction is quickly resumed. For example, it is because of the change in the octane number of the fuel. Further a recovery control operation can be easily performed by checking the value of the knocking feedback correcting quantity.

Figure 9A:
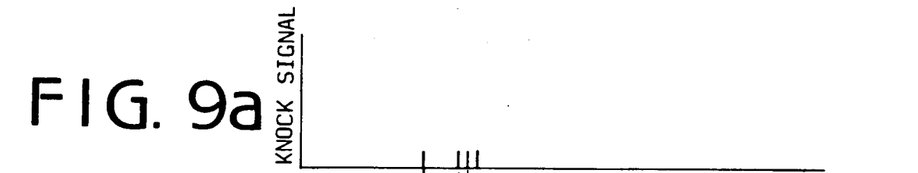
FIG. 9a, 9b and 9c show another example of the time chart that several knockings occur in a predetermined time.
Figure 9B:
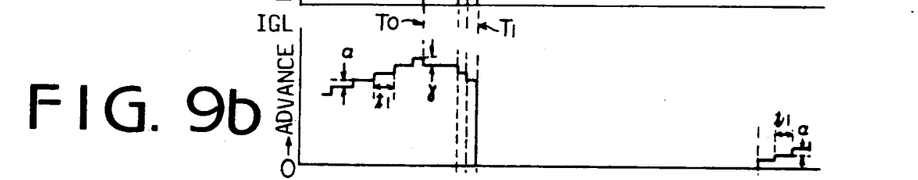
Figure 9C:
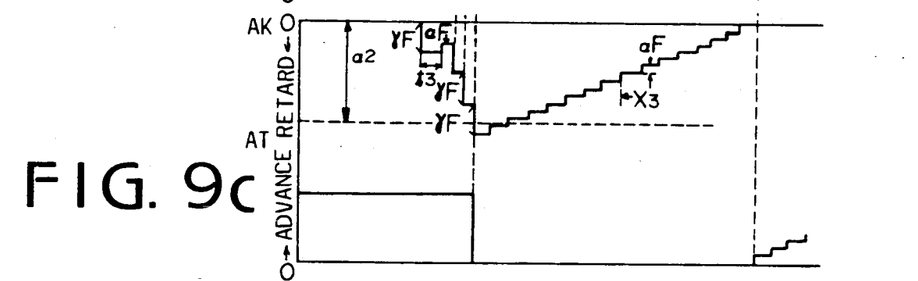

If a few knockings occur in a period between T0 and T1, the feedback correcting quantity AK is retarded by the large value $\gamma_F$, and then corrected by the small value $a_F$ as shown in, FIGS. 9a-9c.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A method for controlling ignition timing of an internal combustion engine having an ignition timing control system for calculating an ignition timing based on a basic ignition timing, a learning correcting quantity including a large correcting quantity and a small correcting quantity, and a feedback correcting quantity, the method comprising the steps of:

detecting an occurrence of knocking;
   producing a knock signal responsive to said occurrence of knocking;
   converging the feedback correcting quantity to a large retard value in response to the knock signal;
   comparing the large retard value with a predetermined reference value;
   generating a change signal when the large retard value exceeds the reference value; and
   changing the learning correcting quantity of the small correcting quantity to the learning correcting quantity of the large correcting quantity in response to the change signal.

2. The method according to claim 1, wherein the change of the feedback correcting quantity to the large retard value is performed by subtracting a large retard value from the feedback correcting quantity.

3. A system for controlling ignition timing of an internal combustion engine having an ignition timing control system for calculating an ignition timing based on a basic ignition timing, a learning correcting quantity including a large correcting quantity and a small correcting quantity, and a feedback correcting quantity, the system comprising:

detector means for detecting an occurrence of knocking and for producing a knock signal;
   changing means responsive to the knock signal for changing the feedback correcting quantity to a large retard value;
   comparing means for comparing the large retard value with a predetermined reference value and for producing a change signal when the large retard value exceeds the reference value; and
   means responsive to the change signal for changing the learning correcting quantity of the small correcting quantity to the learning correcting quantity of the large correcting quantity.

* * * * *